United States Patent [19]
Cohen

[11] Patent Number: 5,774,605
[45] Date of Patent: Jun. 30, 1998

[54] RIBBON ARRAY OPTICAL SWITCH AND OPTICAL SWITCH ARCHITECTURE UTILIZING SAME

[75] Inventor: Leonard George Cohen, Atlanta, Ga.

[73] Assignee: Lucent Technologies, Inc., Murray Hill, N.J.

[21] Appl. No.: 741,895

[22] Filed: Oct. 31, 1996

[51] Int. Cl.$^6$ ........................................... G02B 6/26
[52] U.S. Cl. ................................ 385/22; 385/16; 385/17; 385/134
[58] Field of Search ................................. 385/22, 16, 17, 385/20, 21, 23, 134, 137

[56] References Cited

U.S. PATENT DOCUMENTS

| | | | |
|---|---|---|---|
| 5,329,392 | 7/1994 | Cohen | 359/124 |
| 5,446,810 | 8/1995 | Watanabe et al. | 385/22 |

*Primary Examiner*—Phan T. H. Palmer
*Attorney, Agent, or Firm*—Morgan & Finnegan, L.L.P.

[57] ABSTRACT

A ribbon array switch in which an input ribbon array comprising a plurality of input optical fibers can be selectively switched to any one of a plurality of output ribbon arrays mounted on an outer periphery of a switch housing. Preferably, the input ribbon is rotated, whereby the input optical fibers will be optically connected to corresponding output optical fibers that make up the output ribbon arrays. Furthermore, the invention features an optical switch architecture including a first stage comprising a fiber switch element and second stage comprising a ribbon array switch element described above. The output optical fibers of the fiber switch element make up the input ribbon array of the ribbon array switch element. The architecture switches an input optical fiber to any one of a plurality of output optical fibers by optically connecting the input optical fiber of the fiber switch element to a selected one of the output optical fibers of the fiber switch element and aligning the input ribbon array of the ribbon array switch element with a selected one of a plurality of output ribbon arrays of the ribbon array switch element. Each output ribbon array comprises a predetermined number of output optical fibers. Accordingly, the output optical fibers of the fiber switch element will be optically connected to corresponding ones of the predetermined number of output optical fibers of the ribbon switch element, and thus the input optical fiber will be optically connected to a desired output optical fiber.

10 Claims, 4 Drawing Sheets

RIBBON ARRAY OPTICAL SWITCH AND OPTICAL SWITCH ARCHITECTURE UTILIZING SAME

FIELD OF THE INVENTION

The invention relates to optical fiber switches, and more particularly, to a ribbon array switch which is capable of switching a single input ribbon array into one of several output ribbon arrays and to an optical switch architecture that is capable of switching a single input optical fiber element into one of a large number of output optical fiber elements.

BACKGROUND OF THE INVENTION

Equipment used to test optical fiber elements, such as an optical time domain reflectometer, or OTDR, tends to be very expensive. Thus, due to this expense, when a large number of optical fibers need to be tested, as is the case with the large number of optical fibers that typically emanate from a central office, each optical fiber cannot have its own dedicated piece of test equipment. Instead, a 1×N optical switch is used, where N is equal to the number of optical fibers to be tested, so that the N optical fibers can share a single piece of test equipment. Using the 1×N optical switch, the single piece of test equipment can be selectively switched to any one of the N optical fibers for testing.

Referring to FIG. 1, a conventional fiber switch element 5 is shown which switches one input optical fiber 10 into one of N output optical fibers 15, where N, for illustrative purposes, in shown here to be equal to twelve. Such a fiber switch element 5 is commonly known as a 1×N fiber switch, or, in the specific embodiment shown in FIG. 1, a 1×12 fiber switch.

As shown in FIG. 1, input optical fiber 10 is mounted on a rotatable arm 20, which in turn is rotatably mounted to a switch housing 25. Switch housing 25 is preferably of a circular shape but may also be other shapes. Located around the outer periphery of switch housing 25 are N output optical fibers 15. The rotatable arm 20 and input optical fiber 10 are adapted to be rotated around the entire outer periphery of the switch housing 25 by a stepper motor 30, as illustrated by the arrow in FIG. 1. Thus, by selectively rotating the rotatablely arm 20 using the stepper motor 30, the input optical fiber 10 can be aligned with and thus optically connected to any one of the N output optical fibers 15.

Referring to FIG. 2, a switch architecture 40 for switching one input fiber 10 to any one of N output optical fibers 15B is shown. Architecture 40 is suitable for large values of N. For illustrative purposes, N is shown in FIG. 2 to be equal to 144.

Architecture 40 includes a first stage in which a 1×12 fiber switch element 5A of the type shown in FIG. 1 is used to switch input optical fiber 10 into any one of first stage output optical fibers 15A. Architecture 40 also includes a second stage which is made up of twelve fiber switch elements 5B of the type shown in FIG. 1. Each fiber switch element 5B in the second stage takes as its input one of the first stage output optical fibers 15A. Thus, in each of the second stage fiber switch elements 5B, the corresponding first stage output optical fiber 15A can be switched into any one the second stage output optical fibers 15B. Accordingly, by selectively switching the first stage fiber switch element 5A and the appropriate second stage fiber switch element 5B, the input optical fiber 10 can be switched and optically connected to any one of the 144 second stage output optical fibers 15B.

A significant problem with a 1×N optical switch that utilizes architecture 40 is that the large number of fiber switch elements 5 necessary to implement architecture 40 drives up the cost of the device.

SUMMARY OF THE INVENTION

In one aspect, the invention features a ribbon array switch comprising a switch housing, a rotatable arm rotatably mounted to the switch housing, an input ribbon array mounted to the rotatable arm, the input ribbon array comprising a plurality of input optical fibers, a plurality of output ribbon arrays mounted on an outer periphery of the switch housing, each of the output ribbon arrays comprising a plurality of output optical fibers, and a motor connected to the rotatable arm for rotating it along the outer periphery of the switch housing such that the input ribbon array can be selectively aligned with any one of the output ribbon arrays, the result being that the input optical fibers will be optically connected to corresponding ones of the output optical fibers.

In another aspect, the invention features an optical switch architecture comprising a fiber switch wherein an input optical fiber of the fiber switch can be selectively optically connected to any one of a plurality of first output optical fibers of the fiber switch, and a ribbon array switch having an input ribbon array and a plurality of output ribbon arrays, the input ribbon array comprising the output optical fibers of the fiber switch and each of the output ribbon arrays comprising a plurality of second output optical fibers, wherein the input ribbon array can be selectively aligned with any one of the output ribbon arrays, the result being that the first output optical fibers are optically connected to corresponding ones of the second output optical fibers.

In a further aspect, the invention features a method of switching an input optical fiber to any one of a plurality of output optical fibers comprising the steps of optically connecting the input optical fiber to a selected one of a plurality of preliminary output optical fibers and aligning an input ribbon array comprising the preliminary output optical fibers with a selected one of a plurality of output ribbon arrays, each of the output ribbon arrays comprising a predetermined number of the output optical fibers, the result being that the preliminary output optical fibers are optically connected to corresponding ones of the predetermined number of output optical fibers.

DETAILED DESCRIPTION OF THE PREFERRED EMBODIMENTS

Figure 3:
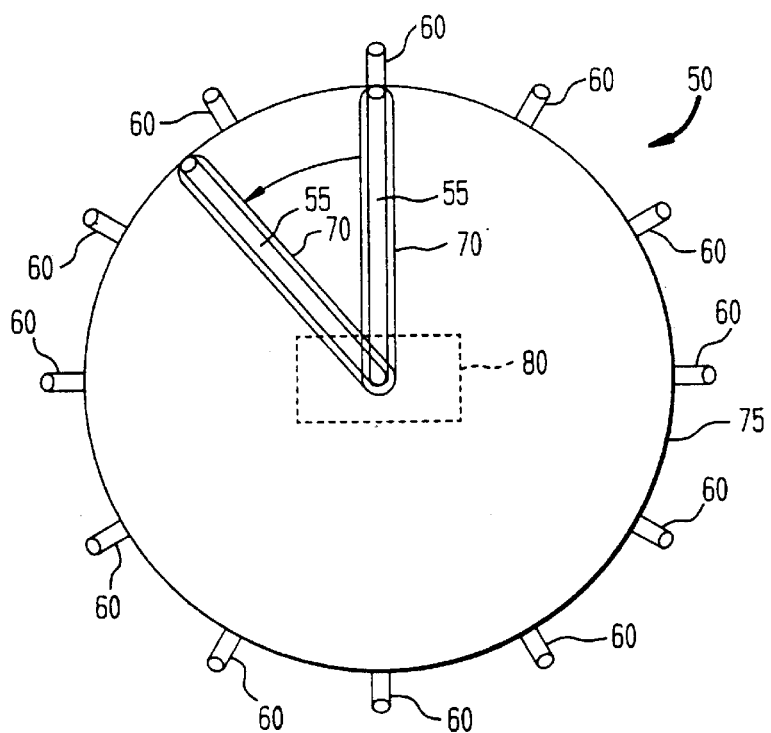
FIG. 3 is a top view of a ribbon array switch element according to an aspect of the present invention.
Figure 4:
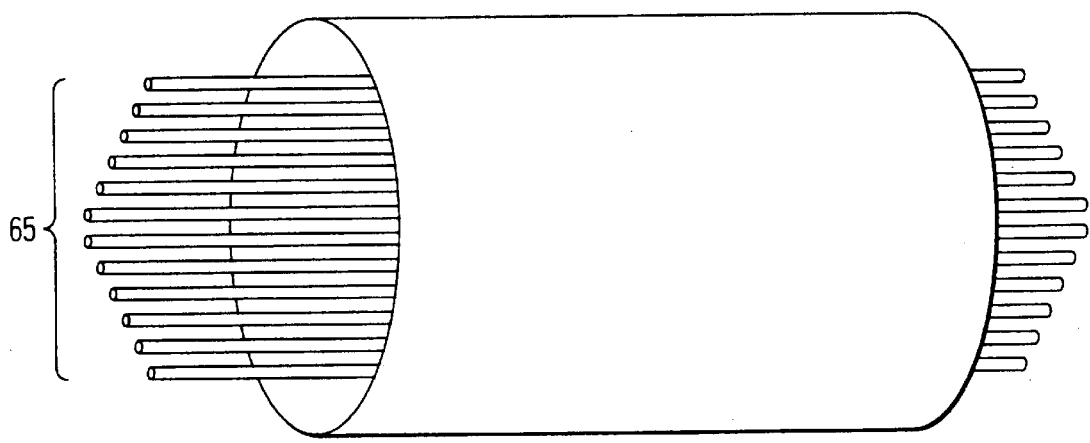
FIG. 4 is a diagram of a conventional fiber optic ribbon array.

Referring to FIG. 3, a ribbon array switch element 50 according to an aspect of the present invention is shown. Ribbon array switch element 50 switches and optically connects an input ribbon array 55 to any one of N output ribbon arrays 60. Again, for illustrative purposes, in FIG. 3 N is shown to be equal to 12. Fiber optic ribbon arrays are well known in the art and comprise generally, as shown in FIG. 4, a bundle of several individual optical fibers 65.

As shown in FIG. 3, input ribbon array 55 is mounted on a rotatable arm 70, which in turn is rotatably mounted to a switch housing 75. Switch housing 75 is preferably of a circular shape but may also be of other shapes. Located around the outer periphery of switch housing 75 are N output ribbon arrays 60. The rotatable arm 70 of the ribbon array switch element 50 is adapted to be rotated around the entire outer periphery of the switch housing 75 by a stepper motor 80, as illustrated by the arrow in FIG. 3. It should be understood that, while stepper motor 80 is the preferred device for imparting motion to the rotatable arm 70 and ribbon array switch element 50, other types of devices, such as a servomotor, or even manual control can be used to impart such motion.

Thus, by selectively rotating the rotatable arm 70 using the stepper motor 80, the input ribbon array 55 can be aligned with any one of the N output ribbon arrays 60. When the ribbon array 55 is aligned with one of the N output ribbon arrays 60, each individual fiber within the input ribbon array 55 is aligned with and thus optically connected to a corresponding individual fiber within the output ribbon array 60.

Figure 5:
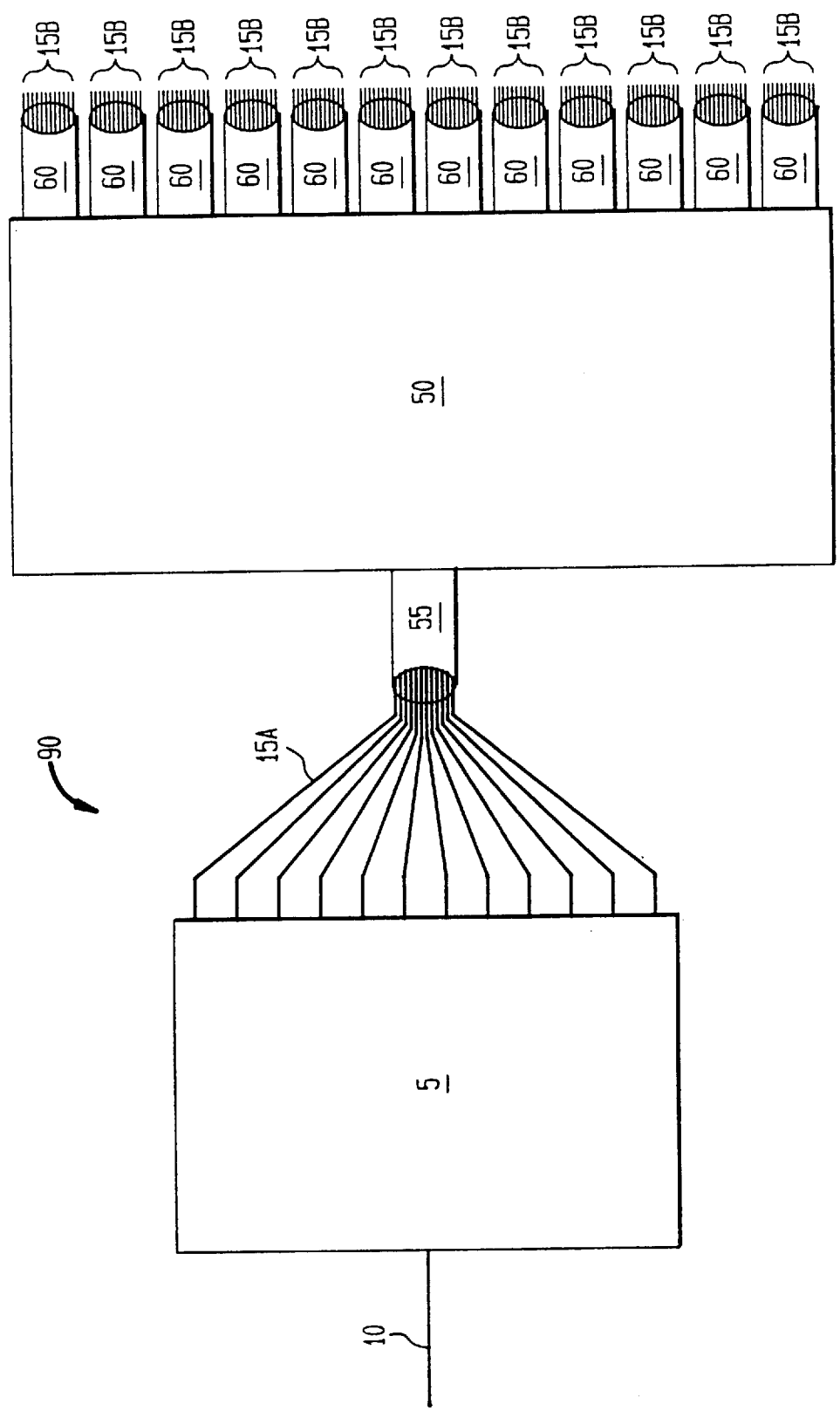
FIG. 5 is a diagram of the 1×144 optical switch architecture according to an aspect of the present invention.

Referring to FIG. 5, an optical switch architecture 90 for large N according to an aspect of the present invention is shown. In architecture 90, a single input fiber element 10 can be switched and optically connected to any one of N output optical fibers 15B which are bundled in predetermined numbers as separate ribbon arrays 60.

Figure 1:
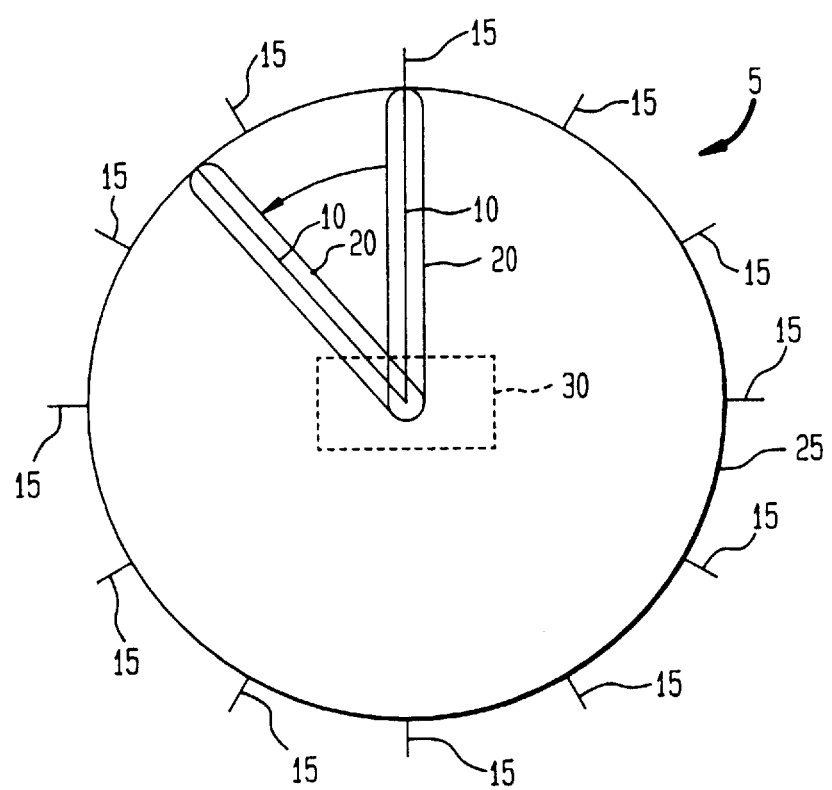
FIG. 1 is a top view of a conventional 1×12 fiber switch element.
Figure 2:
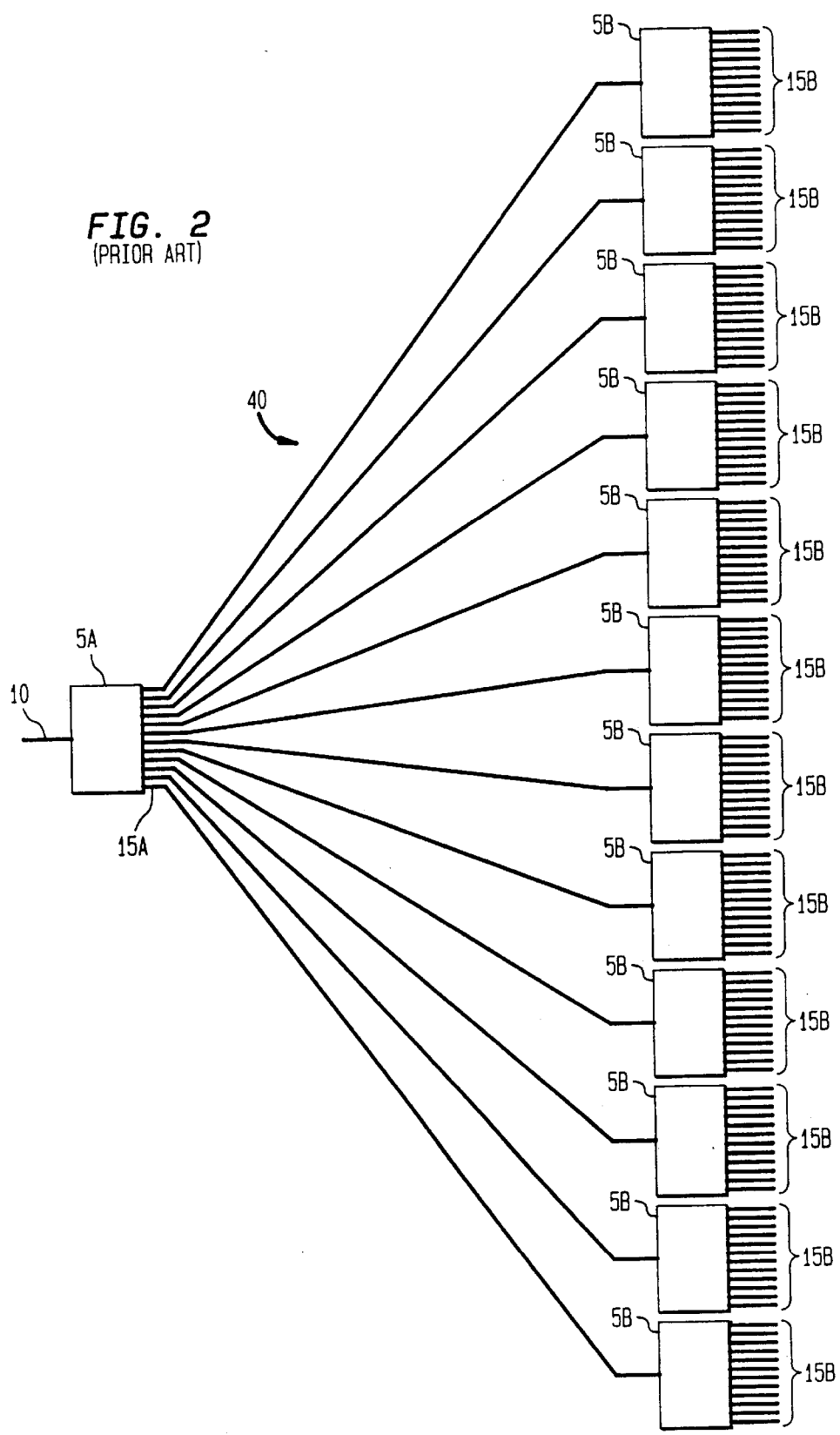
FIG. 2 is a diagram of a conventional 1×144 optical switch architecture.

In particular, architecture 90 includes a first stage made up of fiber switch element 5 of the type shown in FIG. 1, and a second stage made up of a ribbon array switch element 50 of the type shown in FIG. 3. In the first stage, input optical fiber 10 can be switched and optically connected to any one of the output optical fibers 15A in the manner described above. As shown in FIG. 5, the output optical fibers 15A of fiber switch element 5 are bundled together to form the input ribbon array 55 of ribbon array switch element 50 in the second stage. As described above, the input ribbon array 55 can be selectively switched to any one of the output ribbon arrays 60 wherein the individual optical fibers of the input ribbon array 55 will be aligned with and optically connected to corresponding output optical fibers 15B of the selected output ribbon array 60. Thus, the input optical fiber 10 can be selectively switched to any one of the 144 output optical fibers 15B: by first, selectively switching the input optical fiber 10 to a desired output optical fiber 15A, and thus to a desired fiber within the input ribbon array 55; and then selectively switching the input ribbon array 55 to the desired output ribbon array 60 of the ribbon array switch element 50. In this sense, the appropriate output optical fiber 15B within any output ribbon array 60 is chosen first in the first stage, and then the appropriate output ribbon array 60 is chosen second in the second stage.

The optical switch architecture 90 according to the present invention thus provides a 1×N optical switch that requires only two switching elements, namely the fiber switch element 5 and the ribbon array switch element 50, as opposed to the conventional 1×N optical switch, which requires N+1 switching elements.

While presently preferred embodiments of the invention have been disclosed, it is to be understood that the invention is not limited thereto, but that many modifications will be apparent to those of skill in this art. For example, although a 1×12 ribbon array switch element and a 1×144 optical switch architecture were shown and described for illustrative purposes, it is to be understood that other values of N can be readily substituted without changing the scope of the invention. Other modifications are within the scope of the appended claims.

What is claimed is:

1. A ribbon array switch, comprising:
   (a) a switch housing;
   (b) a rotatable arm rotatably mounted to said switch housing;
   (c) an input ribbon array mounted to said rotatable arm, said input ribbon array comprising a plurality of input optical fibers;
   (d) a plurality of output ribbon arrays mounted on an outer periphery of said switch housing, each of said output ribbon arrays comprising a plurality of output optical fibers; and
   (e) a motor connected to said rotatable arm for rotating said rotatable arm along said outer periphery of said switch housing wherein said input ribbon array can be selectively aligned with any one of said output ribbon arrays such that said input optical fibers are optically connected to corresponding ones of said output optical fibers.

2. A ribbon array switch according to claim 1, wherein said switch housing is circular and wherein said outer periphery comprises a circumference of said switch housing.

3. A ribbon array switch according to claim 1, wherein said motor comprises a stepper motor.

4. An optical switch, comprising:
   (a) a fiber switch having an input optical fiber and a plurality of first output optical fibers, wherein said input optical fiber can be selectively optically connected to any one of said first output optical fibers; and
   (b) a ribbon switch having an input ribbon array and a plurality of output ribbon arrays, said input ribbon array comprising said first output optical fibers, each of said output ribbon arrays comprising a plurality of second output optical fibers, wherein said input ribbon array can be selectively aligned with any one of said output ribbon arrays such that said first output optical fibers are optically connected to corresponding ones of said second output optical fibers.

5. An optical switch according to claim 4, wherein said input optical fiber is selectively optically connected to any one of said first output optical fibers by manipulating said input optical fiber such that said input optical fiber is aligned with said one of said first output optical fibers.

6. An optical switch according to claim 5, wherein said input optical fiber is manipulated by a stepper motor.

7. An optical switch according to claim 4, wherein said input ribbon array is aligned with any one of said output ribbon arrays by manipulating said input ribbon array.

8. An optical switch according to claim 7, wherein said input ribbon array is manipulated by a stepper motor.

9. An optical switch, comprising:
   (a) means for selectively optically connecting an input optical fiber to any one of a plurality of first output optical fibers; and
   (b) means for selectively aligning an input ribbon array comprising said first output optical fibers with any one of a plurality of output ribbon arrays, each of said output ribbon arrays comprising a plurality of second output optical fibers, such that said first output optical fibers are optically connected to corresponding ones of said second output optical fibers.

10. A method of switching an input optical fiber to any one of a plurality of output optical fibers, comprising the steps of:
   (a) optically connecting said input optical fiber to a selected one of a plurality of preliminary output optical fibers; and
   (b) aligning an input ribbon comprising said preliminary output optical fibers with a selected one of a plurality of output ribbon arrays, each of said output ribbon arrays comprising a predetermined number of said output optical fibers, such that said preliminary output optical fibers are optically connected to corresponding ones of said predetermined number of output optical fibers.

* * * * *